(No Model.)
J. EVINOF.
LOCKING NUT.
No. 542,878. Patented July 16, 1895.
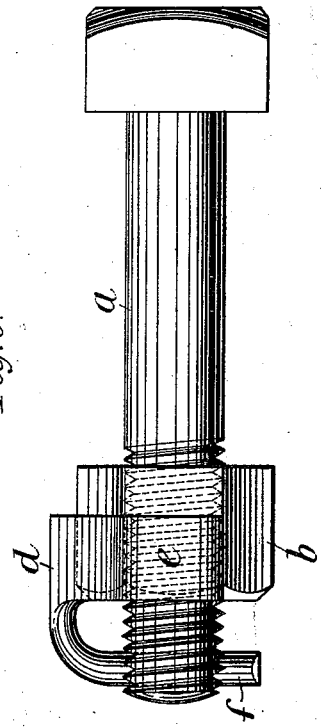
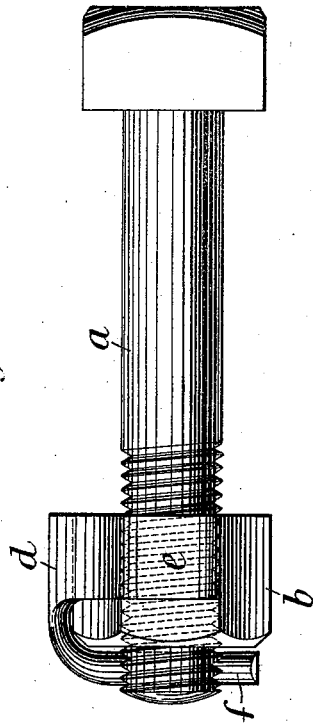
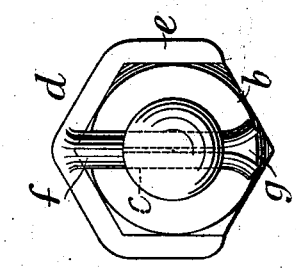
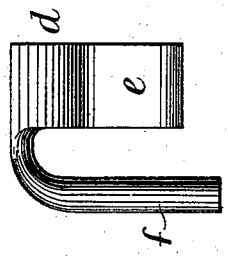
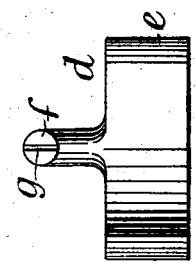
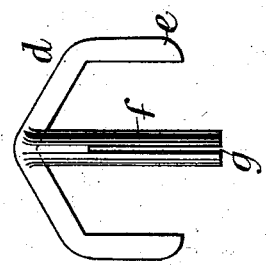
Witnesses. Inventor.

UNITED STATES PATENT OFFICE.

JULIUS EVINOF, OF LONDON, ENGLAND.

LOCKING NUTS.

SPECIFICATION forming part of Letters Patent No. 542,878, dated July 16, 1895.

Application filed November 19, 1894. Serial No. 529,294. (No model.)

*To all whom it may concern:*

Be it known that I, JULIUS EVINOF, a subject of the Emperor of Russia, residing at London, England, have invented new and useful Improvements in Locking Nuts, of which the following is a specification.

This invention relates to an improved device for locking nuts so as to prevent their working loose.

In carrying out my invention I employ a metal strap or clip adapted to take over the nut, the said strap or clip being provided with a projection or pin at right angles to the axis of the bolt and adapted when the nut is screwed tight to pass into a hole in the bolt. The said pin is advantageously split so that when passed into the hole in the bolt it springs out or can be opened out, so that it will hold the locking device firmly in position.

To enable my invention to be fully understood, I will describe the same by reference to the accompanying drawings, in which—

Figures 1, 2, and 3 are respectively a plan, a front view, and a side view of my improved device for locking nuts. Figs. 4 and 5 are respectively a side and an end view of a bolt and nut with the device applied thereto. Fig. 6 is a similar view to Fig. 4, but showing the nut in a different position.

Similar letters of reference indicate similar or corresponding parts in all the figures.

*a b* respectively indicate a bolt and nut, both of which are of ordinary construction, except that in the end of the bolt a hole *c* is formed.

D indicates my locking device, which device comprises a strap or clip *e*, designed to embrace the nut, as clearly shown in Fig. 5, (where it is represented as being shaped to fit four sides of a hexagonal nut,) and a pin *f* bent so as to be parallel with the plane of the nut to which it is applied and at right angles to the axis of the bolt *a*, the said pin being split longitudinally, as shown at *g*, Figs. 1 and 2.

It will be understood that when the nut is screwed onto the bolt, for instance, into the position shown either in Figs. 4 or 6, the locking device being applied over the nut, so that the pin *f* enters the hole *c* in the end of the bolt and the split end of the pin opened, as shown in Fig. 5, the nut will be prevented from turning on the bolt.

It will be obvious that from the construction of the locking device it allows of holding the nut in whatever position it may be placed within certain limits provided the nut be in such a position that the pin *f* can enter the hole *c* in the bolt.

Having now particularly described and ascertained the nature of my said invention and in what manner the same is to be performed, I declare that what I claim is—

1. A nut lock comprising a strap having bifurcated portions for engaging a nut to hold it from movement and a split pin formed integrally therewith and lying in a plane parallel with the plane of said bifurcated portions substantially as described.

2. The combination with a bolt provided with a transversely extending aperture and a nut, of a nut lock comprising a strap having bifurcated portions for engaging the nut, to hold it from movement and a split pin lying in a plane parallel with the plane of the bifurcated portions for engaging the transversely extending aperture in the bolt, substantially as described.

JULIUS EVINOF.

Witnesses:
G. F. REDFERN,
JOHN E. BOUSFIELD.